(12) United States Patent
Shi et al.

(10) Patent No.: US 10,691,393 B2
(45) Date of Patent: Jun. 23, 2020

(54) PROCESSING CIRCUIT OF DISPLAY PANEL, DISPLAY METHOD AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tiankuo Shi, Beijing (CN); Xue Dong, Beijing (CN); Dong Chen, Beijing (CN); Xiaomang Zhang, Beijing (CN); Wei Sun, Beijing (CN); Lingyun Shi, Beijing (CN); Yan Li, Beijing (CN); Xiaochuan Chen, Beijing (CN); Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/757,210

(22) PCT Filed: Aug. 7, 2017

(86) PCT No.: PCT/CN2017/096241
§ 371 (c)(1),
(2) Date: Mar. 2, 2018

(87) PCT Pub. No.: WO2018/126678
PCT Pub. Date: Jul. 12, 2018

(65) Prior Publication Data
US 2019/0361658 A1 Nov. 28, 2019

(30) Foreign Application Priority Data
Jan. 3, 2017 (CN) .......................... 2017 1 0001720

(51) Int. Cl.
*G06F 3/14* (2006.01)
*G06F 3/01* (2006.01)
*G06T 5/00* (2006.01)

(52) U.S. Cl.
CPC ............ *G06F 3/1446* (2013.01); *G06F 3/013* (2013.01)

(58) Field of Classification Search
CPC ........ G06F 3/1446; G06F 3/013; G06T 5/003
See application file for complete search history.

(56) References Cited

U.S. PATENT DOCUMENTS

| 4,513,317 A | 4/1985 | Ruoff, Jr. |
| 7,379,078 B1 | 5/2008 | Gosswiler, III et al. |

(Continued)

FOREIGN PATENT DOCUMENTS

| CN | 1705008 A | 12/2005 |
| CN | 101893934 A | 11/2010 |

(Continued)

OTHER PUBLICATIONS $3^{rd}$ Chinese Office Action, English Translation.

(Continued)

*Primary Examiner* — Yi Yang
(74) *Attorney, Agent, or Firm* — Brooks Kushman P.C.

(57) ABSTRACT

A processing circuit of a display panel, a display method and a display device are provided. The display panel is divided into a plurality of display regions. The processing circuit includes: a plurality of display control circuits corresponding to the plurality of display regions respectively; a sight line acquisition circuit configured to acquire a focused region of the display panel on which sight lines of human eyes are focused; and a control circuit configured to determine from the plurality of display regions a first display region overlapping the focused region and a second display (Continued)

region not overlapping the focused region, enable the display control circuit corresponding to the first display region to output first image data, and enable the display control circuit corresponding to the second display region to output second image data having a refresh rate smaller than the first image data.

11 Claims, 4 Drawing Sheets

(56) References Cited

U.S. PATENT DOCUMENTS

| | | | |
|---|---|---|---|
| 9,459,825 | B2 | 10/2016 | Tahan |
| 9,524,694 | B2 | 12/2016 | Wang et al. |
| 9,554,085 | B2 | 1/2017 | Iyer et al. |
| 9,837,053 | B1 | 12/2017 | Cheng et al. |
| 10,043,492 | B2 | 8/2018 | Woo et al. |
| 10,281,719 | B2 | 5/2019 | Lee et al. |
| 2002/0141614 | A1 | 10/2002 | Lin |
| 2003/0147295 | A1* | 8/2003 | Frankowsky ......... G11C 11/406 365/222 |
| 2009/0290811 | A1* | 11/2009 | Imai .................. G06T 3/4061 382/285 |
| 2012/0162238 | A1 | 6/2012 | Fleck et al. |
| 2014/0002352 | A1 | 1/2014 | Jacob et al. |
| 2014/0085276 | A1 | 3/2014 | Jang et al. |
| 2014/0308807 | A1* | 10/2014 | Hu .................... H01L 21/28185 438/589 |
| 2015/0042553 | A1* | 2/2015 | Mecham ............... G09G 3/003 345/156 |
| 2015/0061989 | A1 | 3/2015 | Timm et al. |
| 2015/0070357 | A1* | 3/2015 | Tahan ..................... G06F 3/14 345/428 |
| 2015/0310797 | A1 | 10/2015 | Pollok |
| 2016/0125785 | A1 | 5/2016 | Wang et al. |
| 2016/0366365 | A1 | 12/2016 | Iyer et al. |
| 2017/0221411 | A1 | 8/2017 | Chang |
| 2018/0102082 | A1 | 4/2018 | Pollock |
| 2018/0366068 | A1 | 12/2018 | Liu et al. |

FOREIGN PATENT DOCUMENTS

| | | |
|---|---|---|
| CN | 102610188 A | 7/2012 |
| CN | 102855845 A | 1/2013 |
| CN | 103207664 A | 7/2013 |
| CN | 103680382 A | 3/2014 |
| CN | 103974115 A | 8/2014 |
| CN | 104123906 A | 10/2014 |
| CN | 104133548 A | 11/2014 |
| CN | 104395857 A | 3/2015 |
| CN | 104423575 A | 3/2015 |
| CN | 105096892 A | 11/2015 |
| CN | 1054088338 A | 3/2016 |
| CN | 106254952 A | 12/2016 |
| CN | 106652972 A | 5/2017 |
| CN | 106782268 A | 5/2017 |
| WO | 2016022265 A1 | 2/2016 |

OTHER PUBLICATIONS

CN 102610188A, English Abstract and Machine Translation.
First Office Action for Chinese Application No. 201710001720.3, dated Jun. 25, 2018, 9 Pages.
International Search Report and Written Opinion for Application No. PCT/CN2017/096241, dated Oct. 26, 2017, 10 Pages.
Third Office Action for Chinese Application No. 201710001720.3, dated Jun. 24, 2019, 12 Pages.
Second Office Action for Chinese Application No. 201710003903.9, dated Jul. 17, 2019, 7 Pages.
International Search Report and Written Opinion for Application No. PCT/CN2017/094703, dated Oct. 20, 2017, 10 Pages.
Non-Final Rejection for copending U.S. Appl. No. 15/747,381, dated Apr. 22, 2019, 11 Pages.
Final Rejection for copending U.S. Appl. No. 15/747,381, dated Sep. 13, 2019, 13 Pages.

* cited by examiner

PROCESSING CIRCUIT OF DISPLAY PANEL, DISPLAY METHOD AND DISPLAY DEVICE

CROSS-REFERENCE TO RELATED APPLICATIONS

This application is the U.S. national phase of PCT Application No. PCT/CN2017/096241 filed on Aug. 7, 2017, which claims priority to Chinese Patent Application No. 201710001720.3 filed on Jan. 3, 2017, which are incorporated herein by reference in their entireties.

TECHNICAL FIELD

The present disclosure relates to the field of display technology, in particular to a processing circuit of a display panel, a display method and a display device.

BACKGROUND

Along with the development of the display technology, display quality of a display device is highly demanded. Usually, the higher the display quality (i.e., the larger the definition) is, the larger the refresh rate of a display panel is. However, due to the large refresh rate, a large quantity of processing resources of the display device may be occupied inevitably, and the power consumption of the display device may increase significantly.

SUMMARY

An object of the present disclosure is to provide a processing circuit of a display panel, a display method and a display device, so as to solve the above-mentioned problem.

In one aspect, the present disclosure provides in some embodiments a processing circuit of a display panel. The display panel is divided into a plurality of display regions. The processing circuit includes: a plurality of display control circuits corresponding to the plurality of display regions respectively; a sight line acquisition circuit configured to acquire a focused region of the display panel on which sight lines of human eyes are focused; and a control circuit configured to determine from the plurality of display regions a first display region overlapping the focused region and a second display region not overlapping the focused region, enable the display control circuit corresponding to the first display region to output first image data, and enable the display control circuit corresponding to the second display region to output second image data having a refresh rate smaller than the first image data.

In a possible embodiment of the present disclosure, the sight line acquisition circuit is further configured to track eyeballs of human eyes, so as to detect a direction of the sight lines by following the eyeballs, and determine the focused region on which the sight lines are focused.

In a possible embodiment of the present disclosure, the sight line acquisition circuit includes: a face identification sub-circuit configured to extract a face using a face detection algorithm, so as to acquire a face region and determine a face deflection angle; an eye identification sub-circuit configured to detect an eye feature at the face region, so as to acquire an eye region and determine a distance between each eye and the display panel; an offset calculation sub-circuit configured to determine center points of pupils of two eyes at the eye region, and calculate movement amounts of the center points of the pupils of the two eyes, respectively; a direction vector calculation sub-circuit configured to calculate direction vectors of the sight lines for the two eyes in accordance with the movement amounts of the center points of the pupils of the two eyes and the face deflection angle; and a focused region determination sub-circuit configured to calculate the focused region of the display panel on which the sight lines are focused in accordance with the direction vectors of the sight lines and space coordinates of the two eyes relative to the display panel.

In a possible embodiment of the present disclosure, the control circuit includes: an original image data acquisition sub-circuit configured to acquire first original image data of an image to be displayed at the first display region and second original image data of an image to be displayed at the second display region; and a processing sub-circuit configured to apply a frame interpolation algorithm to the first original image data to acquire the first image data for the first display region, and directly output the second original image data as the second image data for the second display region.

In a possible embodiment of the present disclosure, the refresh rate of the first image data is twice that of the second image data.

In another aspect, the present disclosure provides in some embodiments a display device including a display panel and the above-mentioned processing circuit.

In a possible embodiment of the present disclosure, a base substrate of the display panel is a silicon substrate which is divided into a plurality of circuit regions corresponding to the plurality of display regions respectively. The display control circuit corresponding to each display region is integrated into the corresponding circuit region.

In a possible embodiment of the present disclosure, the processing circuit is integrated into the silicon substrate.

In a possible embodiment of the present disclosure, the display device is a head-mounted display device.

In yet another aspect, the present disclosure provides in some embodiments a display method for use in a display panel, including steps of: acquiring a focused region of the display panel on which sight lines of human eyes are focused; and determining from a plurality of display regions of the display panel a first display region overlapping the focused region and a second display region not overlapping the focused region, enabling a display control circuit corresponding to the first display region to output first image data, and enabling a display control circuit corresponding to the second display region to output second image data, the first image data having a refresh rate greater than that of the second image data.

In a possible embodiment of the present disclosure, the step of acquiring the focused region of the display panel on which the sight lines of human eyes are focused comprises tracking eyeballs of human eyes, so as to detect a direction of the sight lines by following the eyeballs, and determine the focused region on which the sight lines are focused.

In a possible embodiment of the present disclosure, the step of tracking eyeballs of human eyes, so as to detect a direction of the sight lines by following the eyeballs, and determine the focused region on which the sight lines are focused includes: extracting a face using a face detection algorithm, so as to acquire a face region and determine a face deflection angle; detecting an eye feature at the face region, so as to acquire an eye region and determine a distance between the eye and the display panel; determining center points of pupils of two eyes at the eye region, and calculating movement amounts of the center points of the pupils of the two eye, respectively; calculating direction vectors of the sight lines for the two eyes in accordance with the movement amounts of the center points of the pupils of the two eye and the face deflection angle; and calculating the focused region of the display panel on which the sight lines are focused in accordance with the direction vectors of the sight lines and space coordinates of the two eyes relative to the display panel.

In a possible embodiment of the present disclosure, the step of enabling the display control circuit corresponding to the first display region to output the first image data and enabling the display control circuit corresponding to the second display region to output the second image data includes: acquiring first original image data of an image to be displayed at the first display region and second original image data of an image to be displayed at the second display region; and applying a frame interpolation algorithm to the first original image data to acquire the first image data for the first display region, and directly outputting the second original image data as the second image data for the second display region.

BRIEF DESCRIPTION OF THE DRAWINGS

The following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

An object of the present disclosure is to provide a processing circuit of a display panel, a display method and a display device, so as to reduce power consumption of the display device while ensuring display quality thereof, thereby to solve the conflict between the display quality and the power consumption of the display device.

Figure 1:
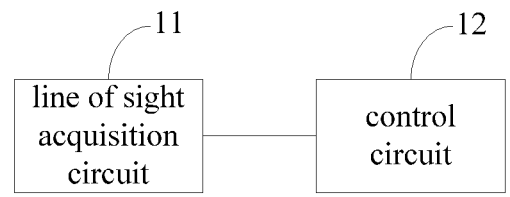
FIG. 1 is a schematic view showing a processing circuit of a display panel according to one embodiment of the present disclosure.

The present disclosure provides in some embodiments a processing circuit of a display panel. The display panel is divided into a plurality of display regions. The processing circuit includes a plurality of display control circuits corresponding to the plurality of display regions respectively, and each display control circuit is configured to output image data to the corresponding display region. As shown in FIG. 1, the processing circuit further includes a sight line acquisition circuit 11 and a control circuit 12.

The sight line acquisition circuit 11 is configured to acquire a region of the display panel on which a sight line is focused. In a possible embodiment of the present disclosure, the sight line acquisition circuit 11 may be further configured to track the sight line (e.g., tack an eyeball), so as to detect a direction of the line of the sight and acquire the focused region.

The control circuit 12 is configured to determine from the plurality of display regions a first display region overlapping the focused region and a second display region not overlapping the focused region, enable the display control circuit corresponding to the first display region to output first image data, and enable the display control circuit corresponding to the second display region to output second image data having a refresh rate smaller than the first image data.

It should be appreciated that, there may exist one or more first display regions overlapping the focused region. Certainly, there may exist one or more second display regions not overlapping the focused region. In the embodiments of the present disclosure, when there is a plurality of first display regions, the display control circuits corresponding to all or parts of the first display regions may output the image data at the refresh rates all larger than the image data outputted by the display control circuit corresponding to any of the second display regions.

According to the embodiments of the present disclosure, through determining the focused region of the line of the sight line, it is able to adjust the refresh rate of the display panel with respect to different regions in such a manner that the refresh rate of an image at the focused region sight line is greater than that of an image at the other region. As a result, it is able to ensure the display quality of the image at the focused region without adversely affecting the user experience, and reduce a data processing burden of the display device, thereby to reduce the power consumption of the display device and extend a battery life of the display device.

Figure 2:
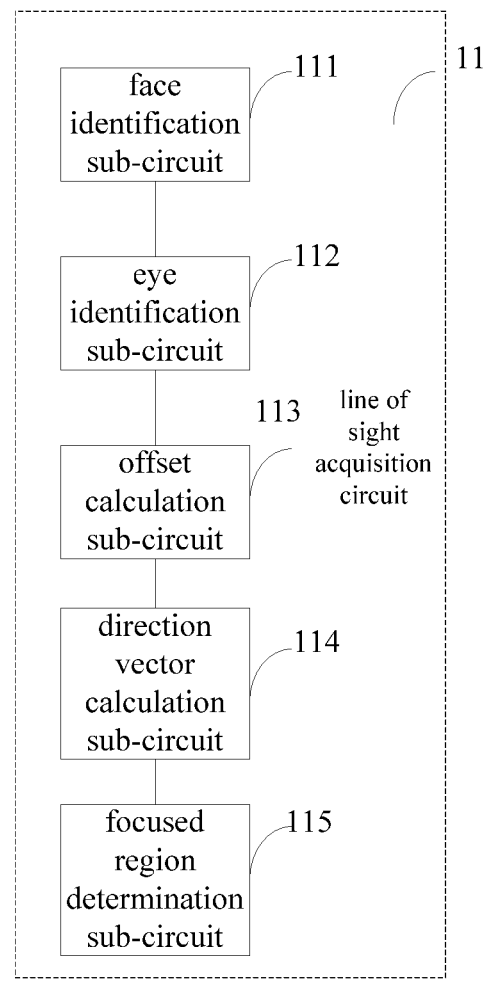
FIG. 2 is a schematic view showing a sight line acquisition circuit according to one embodiment of the present disclosure.

In a possible embodiment of the present disclosure, as shown in FIG. 2, the sight line acquisition circuit 11 includes a face identification sub-circuit 111, an eye identification sub-circuit 112, an offset calculation sub-circuit 113, a direction vector calculation sub-circuit 114, and a focused region determination sub-circuit 115. The face identification sub-circuit 111 is configured to extract a face using a face detection algorithm, so as to acquire a face region and determine a face deflection angle. To be specific, information about a face image of a user may be acquired through an image sensor. The eye identification sub-circuit 112 is configured to detect an eye feature at the face region, so as to acquire an eye region and determine a distance between each eye and the display panel. To be specific, upon the determination of the eye region, information about the pupils of the eyes may be extracted, and then profile analysis may be performed on the information, so as to determine a center of the pupil of each eye. In addition, upon the determination of the eye region, space coordinates of each eye relative to the display panel may be calculated, and then the distance between each eye and the display panel may be calculated in accordance with the space coordinates of each eye relative to the display panel. The offset calculation sub-circuit 113 is configured to determine the center of the pupil of each eye at the eye region, and calculate a movement amount of the center of the pupil of each eye. The direction vector calculation sub-circuit 114 is configured to calculate a direction vector of the sight line for each eye in accordance with the movement amount of the center of the pupil of each eye and the face deflection angle. The focused region determination sub-circuit 115 is configured to calculate the focused region of the display panel on which the sight line is focused in accordance with the direction vector of the sight line and the space coordinates of each eye relative to the display panel.

The above description has been given so as to facilitate the understanding of an eye tracking mode, and it should be appreciated that, any other eye tracking mode may also be applicable, which will not be particularly defined herein.

Figure 3:
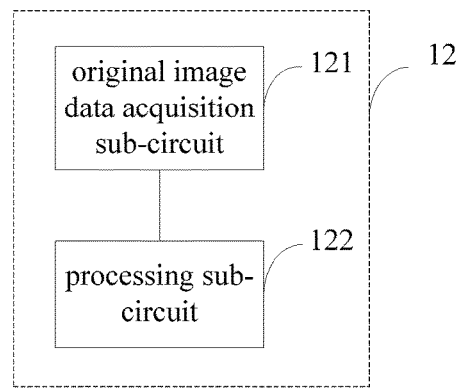
FIG. 3 is a schematic view showing a control circuit according to one embodiment of the present disclosure.

In a possible embodiment of the present disclosure, as shown in FIG. 3, the control circuit 12 includes: an original image data acquisition sub-circuit 121 configured to acquire first original image data of an image to be displayed at the first display region and second original image data of an image to be displayed at the second display region; and a processing sub-circuit 122 configured to apply a frame interpolation algorithm to the first original image data to acquire the first image data for the first display region, and directly output the second original image data as the second image data for the second display region. Through the frame interpolation algorithm, a new image frame is created between two adjacent image frames. For example, the new image frame may be created between every two image frames by a linear or non-linear processing, and there exists a certain relationship between a brightness value at each position in the new image frame and a brightness value at a corresponding position of an adjacent image frame, and a total display time period is kept unchanged, so as to acquire a larger refresh rate.

To be specific, after the application of the frame interpolation algorithm, the refresh rate of the first image data is twice that of the second image data.

Figure 4:
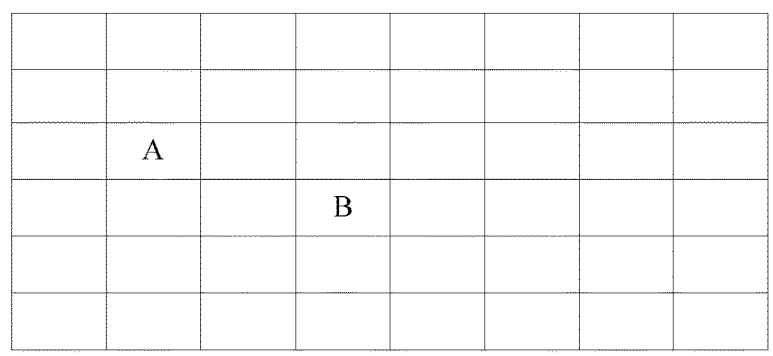
FIG. 4 is a schematic view showing the display panel according to one embodiment of the present disclosure.

The present disclosure provides in some embodiments a display device including a display panel and the above-mentioned processing circuit. As shown in FIG. 4, the display panel is divided into a plurality of display regions. The processing circuit includes a plurality of display control circuits corresponding to the plurality of display regions respectively, and each display control circuit is configured to output image data to the corresponding display region. Through determining the focused region of the display panel by the sight line, it is able to adjust a refresh rate of the display panel with respect to different regions in such a manner that the refresh rate of an image at the focused region sight line is greater than that of an image at the other region, e.g., the refresh rate of an image at a display region A may be greater than that of an image at a display region B. As a result, it is able to ensure the display quality of the image at the focused region without adversely affecting the user experience, and reduce a data processing burden of the display device, thereby to reduce the power consumption of the display device and extend a battery life of the display device.

Figure 5:
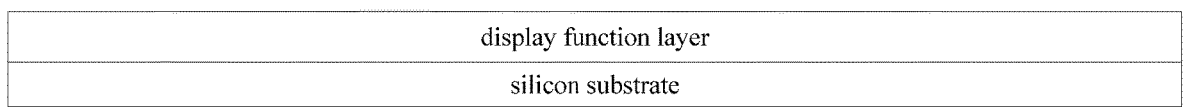
FIG. 5 is a sectional view of the display panel according to one embodiment of the present disclosure.

In a possible embodiment of the present disclosure, as shown in FIG. 5, a base substrate of the display panel is a silicon substrate on which a display function layer is formed. The silicon substrate is divided into a plurality of circuit regions corresponding to the plurality of display regions respectively. The display control circuit corresponding to each display region is integrated into the corresponding circuit region corresponding to the display region. The display panel is divided into a plurality of display regions independent of each other, and through the silicon substrate, it is able to process information about a pixel at any position. Hence, the silicon substrate may be selected as the base substrate of the display panel, and the display control circuit corresponding to each display region may be integrated into the circuit region corresponding to the display region.

In a possible embodiment of the present disclosure, the processing circuit of the display panel may be integrated into the silicon substrate. Due to a very strong information storage capability of the silicon substrate, the processing circuit of the display panel may be integrated into the silicon substrate, so as to simplify the structure of the display device.

In a possible embodiment of the present disclosure, the display device is a head-mounted display device. When the head-mounted display device is used, through determining the focused region of the display panel by the sight line, it is able to adjust the refresh rate of the images at different regions in such a manner that the refresh rate of the image at the focused region is greater than that of the image at the other region. As a result, it is able to ensure the display quality of the image at the focused region without adversely affecting the user experience, and reduce a data processing capacity of the head-mounted display device, thereby to reduce the power consumption of the head-mounted display device and extend a battery life of the head-mounted display device.

Figure 6:
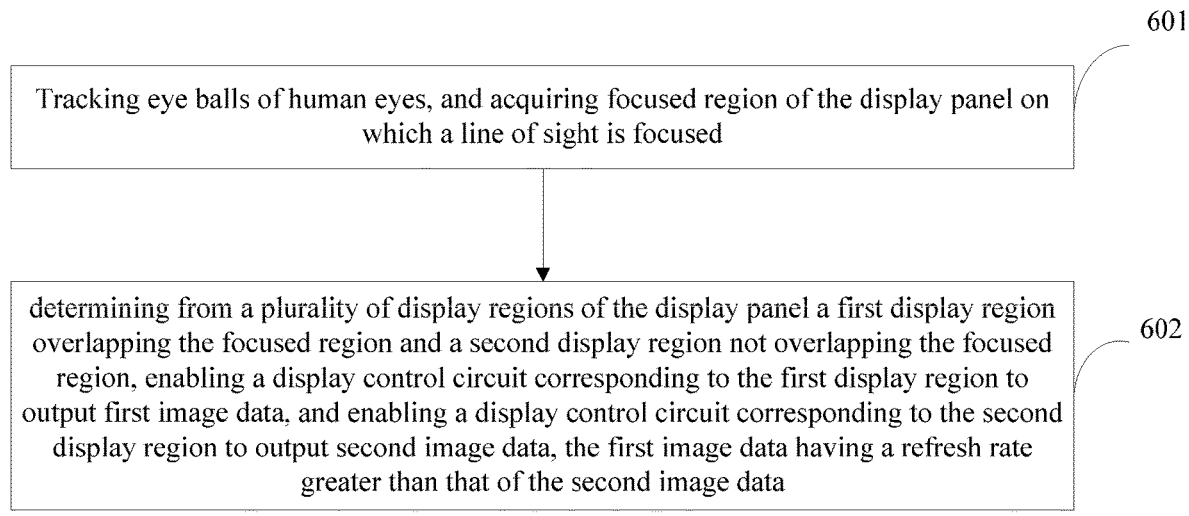
FIG. 6 is a flow chart of a display method for the display panel according to one embodiment of the present disclosure.

The present disclosure provides in some embodiments a display method for use in the above-mentioned display panel. As shown in FIG. 6, the display method includes: Step 601 of acquiring a focused region of the display panel on which a sight line is focused; and Step 602 of determining from a plurality of display regions of the display panel a first display region overlapping the focused region and a second display region not overlapping the focused region, enabling a display control circuit corresponding to the first display region to output first image data, and enabling a display control circuit corresponding to the second display region to output second image data, the first image data having a refresh rate greater than that of the second image data.

According to the embodiments of the present disclosure, through determining the focused region of the display panel on which the sight line is focused, it is able to adjust the refresh rate of the display panel with respect to different regions in such a manner that the refresh rate of an image at the focused region sight line is greater than that of an image at the other region. As a result, it is able to ensure the display quality of the image at the focused region without adversely affecting the user experience, and reduce a data processing burden of the display device, thereby to reduce the power consumption of the display device and extend a battery life of the display device.

Figure 7:
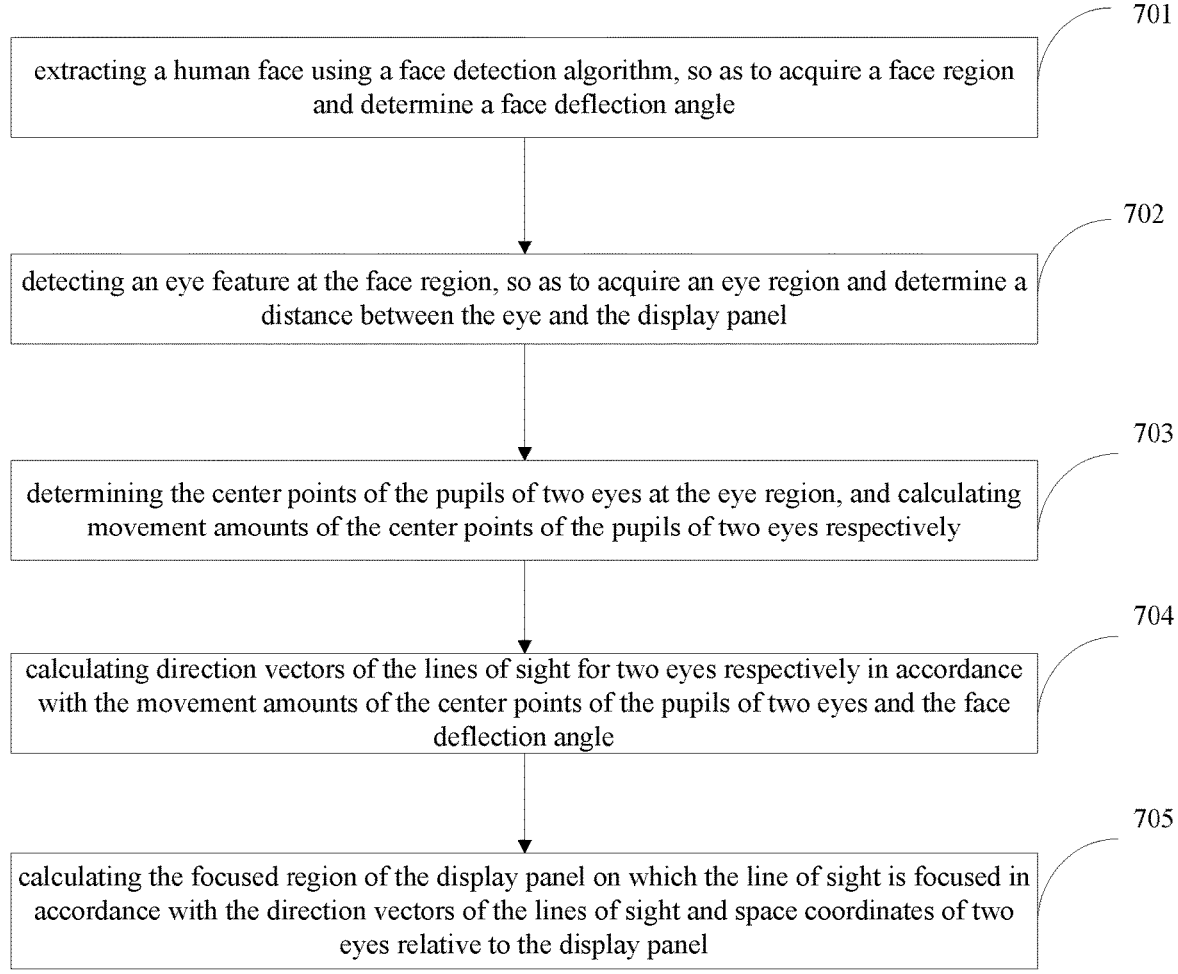
FIG. 7 is a flow chart of a step of tracking an eyeball of a person so as to determine a region of the display panel on which a sight line is focused according to one embodiment of the present disclosure.

In a possible embodiment of the present disclosure, as shown in FIG. 7, the step of tracking the eyeball of a human eye so as to determine the focused region on which the sight line is focused includes Steps 701 to 705.

Step 701: extracting a human face using a face detection algorithm, so as to acquire a face region and determine a face deflection angle. To be specific, information about a face image of a user may be acquired through an image sensor.

Step 702: detecting an eye feature at the face region, so as to acquire an eye region and determine a distance between the eye and the display panel. To be specific, upon the determination of the eye region, information about the pupils of the eyes may be extracted, and then profile analysis may be performed on the information, so as to determine center points of the pupils of two eyes. In addition, upon the determination of the eye region, space coordinates of two eyes relative to the display panel may be calculated, and then the distances between human eyes and the display panel may be calculated in accordance with the space coordinates of two eyes relative to the display panel.

Step 703: determining the center points of the pupils of two eyes at the eye region, and calculating movement amounts of the center points of the pupils of two eyes respectively.

Step 704: calculating direction vectors of the lines of sight for two eyes respectively in accordance with the movement amounts of the center points of the pupils of two eyes and the face deflection angle.

Step 705: calculating the focused region of the display panel on which the sight line is focused in accordance with the direction vectors of the lines of sight and space coordinates of two eyes relative to the display panel.

The above description has been given so as to facilitate the understanding of an eye tracking mode, and it should be appreciated that, any other eye tracking mode may also be applicable, which will not be particularly defined herein.

Figure 8:
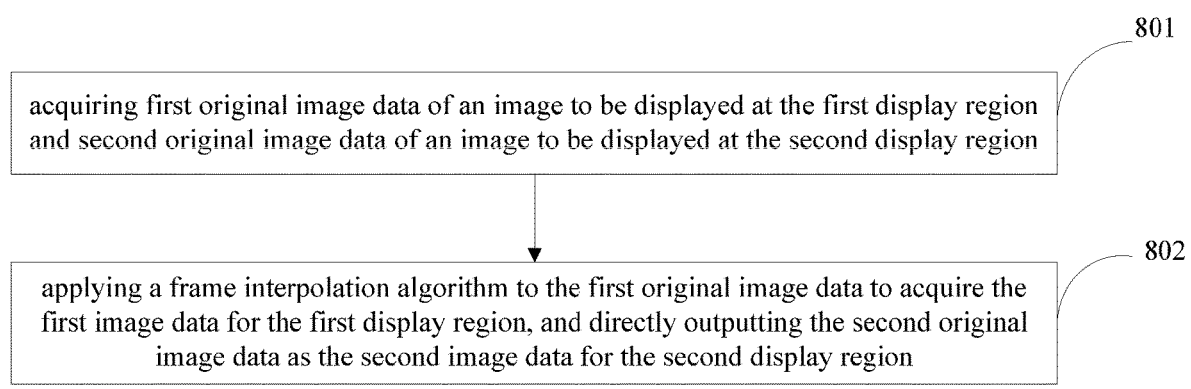
FIG. 8 is a flow chart of a step of enabling a display control circuit corresponding to a first display region to output first image data and enabling a display control circuit corresponding to a second display region to output second image data according to one embodiment of the present disclosure.

In a possible embodiment of the present disclosure, as shown in FIG. 8, the step of enabling the display control circuit corresponding to the first display region to output the first image data and enabling the display control circuit corresponding to the second display region to output the second image data includes: Step 801 of acquiring first original image data of an image to be displayed at the first display region and second original image data of an image to be displayed at the second display region; and Step 802 of applying a frame interpolation algorithm to the first original image data to acquire the first image data for the first display region, and directly outputting the second original image data as the second image data for the second display region.

A frame interpolation algorithm is used to create a new image frame between two adjacent image frames. For example, the new image frame may be created between every two image frames in a linear or non-linear way, and there exists a certain relationship between a brightness value at each position in the new image frame and a brightness value at a corresponding position of an adjacent image frame, the total display time period is kept unchanged, so as to acquire a larger refresh rate. To be specific, after applying the frame interpolation algorithm, the refresh rate of the first image data is twice that of the second image data.

In the embodiments of the present disclosure, the processing circuit may be implemented in any form, e.g., in the form of hardware, firmware or software, or a combination thereof.

Figure 9:
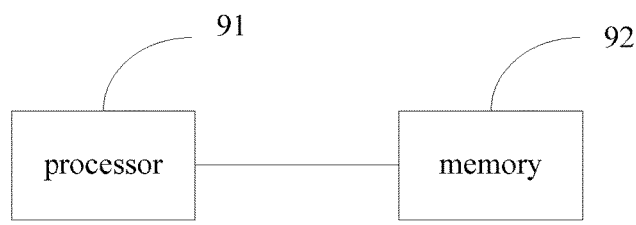
FIG. 9 is another schematic view showing the processing circuit of the display panel according to one embodiment of the present disclosure.

In a possible embodiment of the present disclosure, as shown in FIG. 9, the processing circuit may include a processor 91 and a memory 92. The processor 91 may be an Integrated Circuit (IC) having a signal processing capability. The above steps may be executed by an integrated logic circuit in the form of hardware or instructions in the form of software in the processor 91.

The processor 91 may be a general-purpose processor, including a Central Processing Unit (CPU), a Network Processor (NP), a Digital Signal Processor (DSP), an Application Specific Integrated Circuit (ASIC), a Field Programmable Gate Array (FPGA), or any other programmable logic element, discrete gate or transistor logic element, or discrete hardware assembly, so as to implement or execute the method, the steps and the procedures. The general-purpose processor may be a microprocessor or any other conventional processor. The memory 92 may include a Random Access Memory (RAM) or a Read Only Memory (ROM), and it may be configured to provide instructions and data to the processor 91. The processor 91 and the memory 93 are coupled to each other via a bus system including a power source bus, a control bus and a state signal bus, apart from a data bus.

The processor 91 is configured to read programs and data stored in the memory 92, so as to acquire the focused region of the display panel on which the sight line is focused; and determine from the plurality of display regions the first display region overlapping the focused region and the second display region not overlapping the focused region, enable the display control circuit corresponding to the first display region to output the first image data, and enable the display control circuit corresponding to the second display region to output the second image data having the refresh rate smaller than the first image data.

In the embodiments of the present disclosure, the processing circuit may be implemented by software, so as to be executed by various processors. For example, an identified, executable code module may include one or more physical or logical blocks including computer instructions, and the module may be constructed as an object, a process or a function. Even so, the executable codes of the identified modules are unnecessary to be physically located together, but may include different instructions stored in different locations. When these instructions are logically combined together, they form the modules and achieve the prescribed purposes of the modules.

Actually, the executable code module may be a single instruction or a plurality of instructions, and may even be distributed at different code segments, in different programs, or among a plurality of memory devices. Also, operational data may be identified within the modules, implemented in any appropriate form, and organized in any data structure of an appropriate type. The operational data may be collected as a single data set, or distributed at different locations (included in different memory devices), and may be at least partially present in a system or network merely as an electronic signal.

When the modules are implemented by software, considering the current hardware level, a person skilled in the art may build a corresponding hardware circuit to achieve the corresponding function when taking no account of the cost. The hardware circuit includes a conventional very-large-scale integration (VLSI) circuit, a gate array, an existing semiconductor such as a logic chip and transistors, or other discrete components. The modules may further be implemented by a programmable hardware device, such as a field-programmable gate array, a programmable array logic device and a programmable logic device.

In the embodiments of the present disclosure, the order of the steps is not limited to the serial numbers thereof. For a person skilled in the art, any change in the order of the steps shall also fall within the scope of the present disclosure if without any creative effort.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A processing circuit of a display panel, the display panel being divided into a plurality of display regions, the processing circuit comprising:
   a plurality of display control circuits corresponding to the plurality of display regions respectively;
   a sight line acquisition circuit configured to acquire a focused region of the display panel on which sight lines of human eyes are focused; and
   a control circuit configured to determine from the plurality of display regions a first display region overlapping the focused region and a second display region not overlapping the focused region, enable the display control circuit corresponding to the first display region to output first image data, and enable the display control circuit corresponding to the second display region to output second image data, the first image data having a refresh rate greater than that of the second image data,
   wherein the sight line acquisition circuit is further configured to track eyeballs of human eyes, so as to detect a direction of the sight lines by following the eyeballs, and determine the focused region on which the sight lines are focused,
   wherein the sight line acquisition circuit comprises:
   a face identification sub-circuit configured to extract a face using a face detection algorithm, so as to acquire a face region and determine a face deflection angle;
   an eye identification sub-circuit configured to detect an eye feature at the face region, so as to acquire an eye region and determine a distance between each eye and the display panel;
   an offset calculation sub-circuit configured to determine center points of pupils of two eyes at the eye region, and calculate movement amounts of the center points of the pupils of the two eyes, respectively;
   a direction vector calculation sub-circuit configured to calculate direction vectors of the sight lines for the two eyes in accordance with the movement amounts of the center points of the pupils of the two eyes and the face deflection angle; and
   a focused region determination sub-circuit configured to calculate the focused region of the display panel on which the sight lines are focused in accordance with the direction vectors of the sight lines and space coordinates of the two eyes relative to the display panel.

2. The processing circuit according to claim 1, wherein the control circuit comprises:
   an original image data acquisition sub-circuit configured to acquire first original image data of an image to be displayed at the first display region and second original image data of an image to be displayed at the second display region; and
   a processing sub-circuit configured to apply a frame interpolation algorithm to the first original image data to acquire the first image data for the first display region, and directly output the second original image data as the second image data for the second display region.

3. The processing circuit according to claim 1, wherein the refresh rate of the first image data is twice that of the second image data.

4. A display device, comprising a display panel and the processing circuit according to claim 1.

5. The display device according to claim 4, wherein a base substrate of the display panel is a silicon substrate, the silicon substrate is divided into a plurality of circuit regions corresponding to the plurality of display regions respectively, and the display control circuit corresponding to each display region is integrated into the corresponding circuit region.

6. The display device according to claim 5, wherein the processing circuit is integrated into the silicon substrate.

7. The display device according to claim 4, wherein the display device is a head-mounted display device.

8. The display device according to any claim 4, wherein the control circuit comprises:
   an original image data acquisition sub-circuit configured to acquire first original image data of an image to be displayed at the first display region and second original image data of an image to be displayed at the second display region; and
   a processing sub-circuit configured to apply a frame interpolation algorithm to the first original image data to acquire the first image data for the first display region, and directly output the second original image data as the second image data for the second display region.

9. The display device according to claim 4, wherein the refresh rate of the first image data is twice that of the second image data.

10. A display method for use in a display panel, comprising steps of:
    acquiring a focused region of the display panel on which sight lines of human eyes are focused; and
    determining from a plurality of display regions of the display panel a first display region overlapping the focused region and a second display region not overlapping the focused region, enabling a display control circuit corresponding to the first display region to output first image data, and enabling a display control circuit corresponding to the second display region to output second image data, the first image data having a refresh rate greater than that of the second image data,
    wherein the step of acquiring the focused region of the display panel on which the sight lines of human eyes are focused comprises tracking eyeballs of human eyes, so as to detect a direction of the sight lines by following the eyeballs, and determine the focused region on which the sight lines are focused,
    wherein the step of tracking eyeballs of human eyes, so as to detect a direction of the sight lines by following the eyeballs, and determine the focused region on which the sight lines are focused comprises:
    extracting a face using a face detection algorithm, so as to acquire a face region and determine a face deflection angle;
    detecting an eye feature at the face region, so as to acquire an eye region and determine a distance between the eye and the display panel;
    determining center points of pupils of two eyes at the eye region, and calculating movement amounts of the center points of the pupils of the two eyes, respectively;
    calculating direction vectors of the sight lines for the two eyes in accordance with the movement amounts of the center points of the pupils of the two eyes and the face deflection angle; and
    calculating the focused region of the display panel on which the sight lines are focused in accordance with the direction vectors of the sight lines and space coordinates of the two eyes relative to the display panel.

11. The display method according to claim 10, wherein the step of enabling the display control circuit corresponding to the first display region to output the first image data and enabling the display control circuit corresponding to the second display region to output the second image data comprises:
  acquiring first original image data of an image to be displayed at the first display region and second original image data of an image to be displayed at the second display region; and
  applying a frame interpolation algorithm to the first original image data to acquire the first image data for the first display region, and directly outputting the second original image data as the second image data for the second display region.

* * * * *